United States Patent
Yang et al.

(10) Patent No.: US 10,263,488 B2
(45) Date of Patent: Apr. 16, 2019

(54) STATOR WITH INSULATING BOBBIN IN A BRUSHLESS MOTOR

(71) Applicant: Bergstrom, Inc., Rockford, IL (US)

(72) Inventors: Kuilin Yang, Changzhou (CN); Lei Wang, Changzhou (CN); Gengxiang Li, Changzhou (CN)

(73) Assignee: Bergstrom, Inc., Rockford, IL (US)

(*) Notice: Subject to any disclaimer, the term of this patent is extended or adjusted under 35 U.S.C. 154(b) by 286 days.

(21) Appl. No.: 15/210,541

(22) Filed: Jul. 14, 2016

(65) Prior Publication Data
US 2017/0033635 A1    Feb. 2, 2017

(30) Foreign Application Priority Data

Jul. 16, 2015 (CN) .......................... 2015 1 0420136

(51) Int. Cl.
*H02K 1/00* (2006.01)
*H02K 3/52* (2006.01)
*H02K 3/28* (2006.01)

(52) U.S. Cl.
CPC ............... *H02K 3/522* (2013.01); *H02K 3/28* (2013.01); *H02K 2203/03* (2013.01);
(Continued)

(58) Field of Classification Search
CPC ............. H02K 3/00; H02K 3/32; H02K 3/522
(Continued)

(56) References Cited

U.S. PATENT DOCUMENTS

| 4,287,446 A | 9/1981 | Lill et al. |
| 4,818,911 A * | 4/1989 | Taguchi ................. H02K 1/148 |
| | | 310/194 |

(Continued)

FOREIGN PATENT DOCUMENTS

| CN | 202634122 U | 12/2012 |
| CN | 202737596 U | 2/2013 |

(Continued)

OTHER PUBLICATIONS

Office Action dated Feb. 27, 2017 from The State Intellectual Property Office of the People's Republic of China in related Chinese application No. 201510420136.2.
(Continued)

*Primary Examiner* — Hanh N Nguyen
(74) *Attorney, Agent, or Firm* — Morgan, Lewis & Bockius LLP

(57) ABSTRACT

A brushless motor includes a stator core having a plurality of tooth portions; a lower insulating bobbin connected to a lower face of the stator core, the lower insulating bobbin having a plurality of lower slot insulation portions each corresponding to a respective tooth portion; and an upper insulating bobbin connected to an upper face of the stator core, the upper insulating bobbin having a plurality of upper slot insulation portions each corresponding to a respective tooth portions such that the upper slot insulation portions, the tooth portions, and the lower slot insulation portions define a plurality of coil wound portions. The plurality of coil wound portions includes at least one group of coil wound portions with each group having first to sixth coil wound portions. All of the coil wound portions of all groups are wound by a single lead wire.

18 Claims, 9 Drawing Sheets

(52) U.S. Cl.
CPC ...... *H02K 2203/06* (2013.01); *H02K 2211/03* (2013.01); *H02K 2213/03* (2013.01)

(58) Field of Classification Search
USPC .......................................... 310/179, 194, 208
See application file for complete search history.

(56) References Cited

U.S. PATENT DOCUMENTS

| | | | |
|---|---|---|---|
| 6,021,043 | A | 2/2000 | Horng |
| 6,072,261 | A | 6/2000 | Lin |
| 6,232,687 | B1 | 5/2001 | Hollenbeck et al. |
| 6,992,419 | B2 | 1/2006 | Kim et al. |
| 7,135,799 | B2 | 11/2006 | Rittmeyer |
| 7,385,323 | B2 | 6/2008 | Takahashi et al. |
| 7,821,175 | B2 | 10/2010 | Ionel et al. |
| 7,932,658 | B2 | 4/2011 | Ionel |
| 8,368,275 | B2 * | 2/2013 | Court ............ H02K 3/28 29/596 |
| 8,492,948 | B2 | 7/2013 | Wang et al. |
| 8,841,813 | B2 | 9/2014 | Junak et al. |
| 2002/0011755 | A1 * | 1/2002 | Shteynberg .......... H02K 15/022 310/184 |
| 2007/0103014 | A1 | 5/2007 | Sumiya et al. |
| 2008/0278023 | A1 | 11/2008 | Yamagata |
| 2009/0102308 | A1 * | 4/2009 | Koide ............ H02K 3/28 310/195 |
| 2009/0140590 | A1 | 6/2009 | Hung |
| 2010/0127591 | A1 | 5/2010 | Court et al. |
| 2010/0259119 | A1 | 10/2010 | Wang |
| 2013/0181556 | A1 | 7/2013 | Li et al. |
| 2013/0207506 | A1 | 8/2013 | Chang |
| 2014/0183992 | A1 | 7/2014 | Seo et al. |
| 2015/0137637 | A1 | 5/2015 | Jang et al. |
| 2015/0188376 | A1 | 7/2015 | Yamaguchi et al. |

FOREIGN PATENT DOCUMENTS

| | | |
|---|---|---|
| CN | 202772692 U | 3/2013 |
| CN | 204190510 U | 3/2015 |
| CN | 204334141 U | 5/2015 |
| CN | 204361796 U | 5/2015 |
| CN | 104682597 A | 6/2015 |
| CN | 105071563 A | 11/2015 |
| CN | 105186726 A | 12/2015 |
| CN | 204858771 U | 12/2015 |
| DE | 19942029 A | 3/2001 |
| JP | 2005033941 A | 2/2005 |
| JP | 2010098920 A | 4/2010 |
| WO | 2010/124534 A1 | 11/2010 |

OTHER PUBLICATIONS

Notification to Grant Patent dated Apr. 5, 2017 from The State Intellectual Property Office of the People's Republic of China in related Chinese application No. 201510420136.2.

International Search Report and Written Opinion issued in related technology International Patent Application No. PCT/US2016/042329 dated Sep. 30, 2016.

International Search Report and Written Opinion issued in counterpart International Patent Application No. PCT/US2016/042314 dated Sep. 30, 2016.

International Search Report and Written Opinion issued in related technology International Patent Application No. PCT/US2016/042326 dated Sep. 27, 2016.

International Search Report and Written Opinion issued in related technology International Patent Application No. PCT/US2016/042307 dated Jul. 10, 2016.

Tyco Electronics Corporation, "MAG-MATE Connector With Multispring Pin," https://datasheet.octopart.com/1247003-2-TE-connectivity-datasheet-14918754.pdf, Jan. 2013.

Communication dated Jan. 29, 2019 from the European Patent Office in related European application No. 16825192.4.

* cited by examiner

STATOR WITH INSULATING BOBBIN IN A BRUSHLESS MOTOR

The present invention claims the benefit of Chinese Patent Application No. 201510420136.2, filed in the People's Republic of China on Jul. 16, 2015, which is hereby incorporated by reference.

In addition, Chinese Application Nos. 201510420866.2, 201510419131.8, and 201510420854.X, all of which filed on Jul. 16, 2015, are hereby incorporated by reference.

BACKGROUND OF THE INVENTION

Field of the Invention

The present invention relates to a motor, and more particularly, to a brushless motor having a stator with an insulating bobbin.

Technology Background

A brushless motor is a motor without a brush and a commutator (or collecting ring). A brushless motor operates by changing the alternating frequency and the wave form of a current wave supplied to the winding coil. Brushless motors are widely used by manufacturers in different sizes because of their high efficiency, low energy consumption, low noise, super long life, high reliability, servo controllability, stepless frequency conversion, speed regulating, low cost, and ease of use.

A brushless motor comprises a casing, a printed circuit board (PCB), a rotor, and a stator. The stator includes an upper insulating bobbin, a stator core, a lower insulating bobbin, and a winding on the stator core defining a plurality of coils. The upper insulating bobbin and the lower insulating bobbin are installed respectively on the upper end face and the lower end face of the stator core. A lead wire winds the coil wound portion, which is formed by an upper slot insulation on the upper insulating bobbin, a tooth portion of the stator core and a lower slot insulation of the lower insulating bobbin as per a certain rule. Thus, the wound lead wire forms a stator winding. The PCB is installed on the upper insulating bobbin and electrically connected to the stator winding.

However, the present inventors have identified a number of problems regarding existing brushless motors.

First, when an insulation displacement connection terminal is used, the terminal fixing block on the upper insulating bobbin is located along the radial direction of the upper insulating bobbin, and the terminal socket on the terminal fixing block is arranged along the circumference direction of the upper insulating bobbin. As a result, the puncture notch of the insulation displacement connection terminal is located along the radial direction of the upper insulating bobbin. Consequently, when the lead wire of the stator winding is winding, the lead wire must be routed out along the radial direction of the upper insulating bobbin, thereby increasing the radial dimension of the stator.

Additionally, each coil of the stator winding needs to be equipped with a terminal, and many terminals are used.

Further, each coil needs to be wound by a piece of lead wire, and all the coil wound portions cannot be wound by a single piece of lead wire. As a result, winding operations are increased.

Moreover, the lead wire is normally routed on single face, which is not convenient for the arrangement of other components. Thus, the dimension of the stator must be increased.

SUMMARY

Accordingly, the present invention is directed to a brushless motor that substantially obviates one or more of the problems due to limitations and disadvantages of the related art.

An object of the present invention is to provide a brushless motor that can be easily manufactured.

Another object of the present invention is to provide a brushless motor that can be manufactured in an automated process with high yield.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a brushless motor comprises a stator core having a plurality of tooth portions; a lower insulating bobbin connected to a lower face of the stator core, the lower insulating bobbin having a plurality of lower slot insulation portions each corresponding to a respective tooth portion; and an upper insulating bobbin connected to an upper face of the stator core, the upper insulating bobbin having a plurality of upper slot insulation portions each corresponding to a respective tooth portions such that the upper slot insulation portions, the tooth portions, and the lower slot insulation portions define a plurality of coil wound portions, wherein the plurality of coil wound portions includes at least one group of coil wound portions, each group of coil wound portions having a first coil wound portion, a second coil wound portion, a third coil wound portion, a fourth coil wound portion, a fifth coil wound portion, and a sixth coil wound portion, wherein a single piece of lead wire is routed into an upper part of the first coil wound portion to be wound around the first coil wound portion, wherein the lead wire is routed out of the lower part of the first coil wound portion and into a lower part of the fourth coil wound portion to be wound around the fourth coil wound portion, wherein the lead wire is routed out of an upper part of the fourth coil wound portion and into an upper part of the fifth coil wound portion to be wound around the fourth coil wound portion, wherein the lead wire is routed out of the lower part of the fifth coil wound portion and into a lower part of the second coil wound portion to be wound around the second coil wound portion, wherein the lead wire is routed out of an upper part of the second coil wound portion and into an upper part of the third coil wound portion to be wound around the third coil wound portion, and wherein the lead wire is routed out of the lower part of the third coil wound portion and into a lower part of the sixth coil wound portion to be wound around the sixth coil wound portion and routed out from an upper part of the sixth coil.

In another aspect, a brushless motor comprises a stator having a plurality of coil wound portions; a single lead wire wound around each of the coil wound portions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Reference will now be made in detail to embodiments of the present invention, examples of which are illustrated in the accompanying drawings.

As will be described, by providing a wire-through notch of the terminal fixing block on an upper insulating bobbin along a circumference direction of the upper insulating bobbin and by providing the terminal socket of the terminal fixing block along the radial direction of the upper insulating bobbin, the puncture notch of the insulation displacement connection terminal can be located along the circumference direction of the upper insulating bobbin so that the lead wire can be laid out along the circumference direction of an upper surface of the upper insulating bobbin when the winding is performed so as to greatly reduce the radial dimension of the stator. Further, each group of the coil wound portion of the stator core can be wound with a configuration using a single piece of lead wire. For example, a single piece of lead wire may be routed into the upper part of a first coil wound portion first and finish winding the first coil wound portion. Then, the lead wire may be routed out of the lower part of the first coil wound portion and into a lower part of a fourth coil wound portion. After finishing winding the fourth coil wound portion, the lead wire may be routed out of an upper part of the fourth coil wound portion and into an upper part of a fifth coil wound portion. After finishing winding the fifth coil wound portion, the lead wire may be routed out of a lower part of the fifth coil wound portion and into a lower part of a second coil wound portion. After finishing winding the second coil wound portion, the lead wire may be routed out of an upper part of the second coil wound portion and into an upper part of a third coil wound portion. After finishing winding the third coil wound portion, the lead wire may be routed out of a lower part of the third coil wound portion and into a lower part of a sixth coil wound portion. After finishing winding the sixth coil wound portion, the lead wire may be routed out of an upper part of the sixth coil wound portion. The coil wound portions of adjacent groups are connected by their upper parts. Therefore, all coils of the stator winding can be wound by a single piece of lead wire so that winding operations can be reduced. Additionally, adjacent coil wound portions can share one insulation displacement connection terminal, thereby reducing the number of the insulation displacement connection terminals and reducing cost. Moreover, because the lead wire is routed from upper and lower of the coil wound portion, space of the end face of the stator can be best utilized and the internal room of the brushless motor may be properly used, thereby permitting convenient for arrangement of other components.

Figure 1:
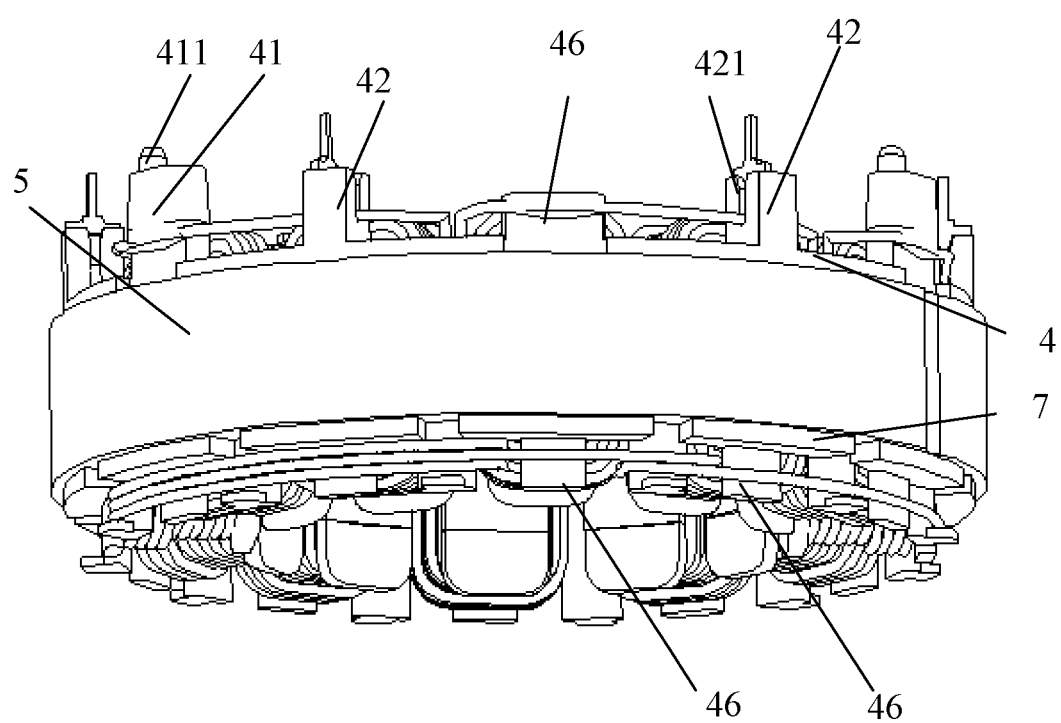
FIG. 1 is a perspective view showing the structure of a stator with an insulating bobbin according to an example embodiment of the present invention.
Figure 2:
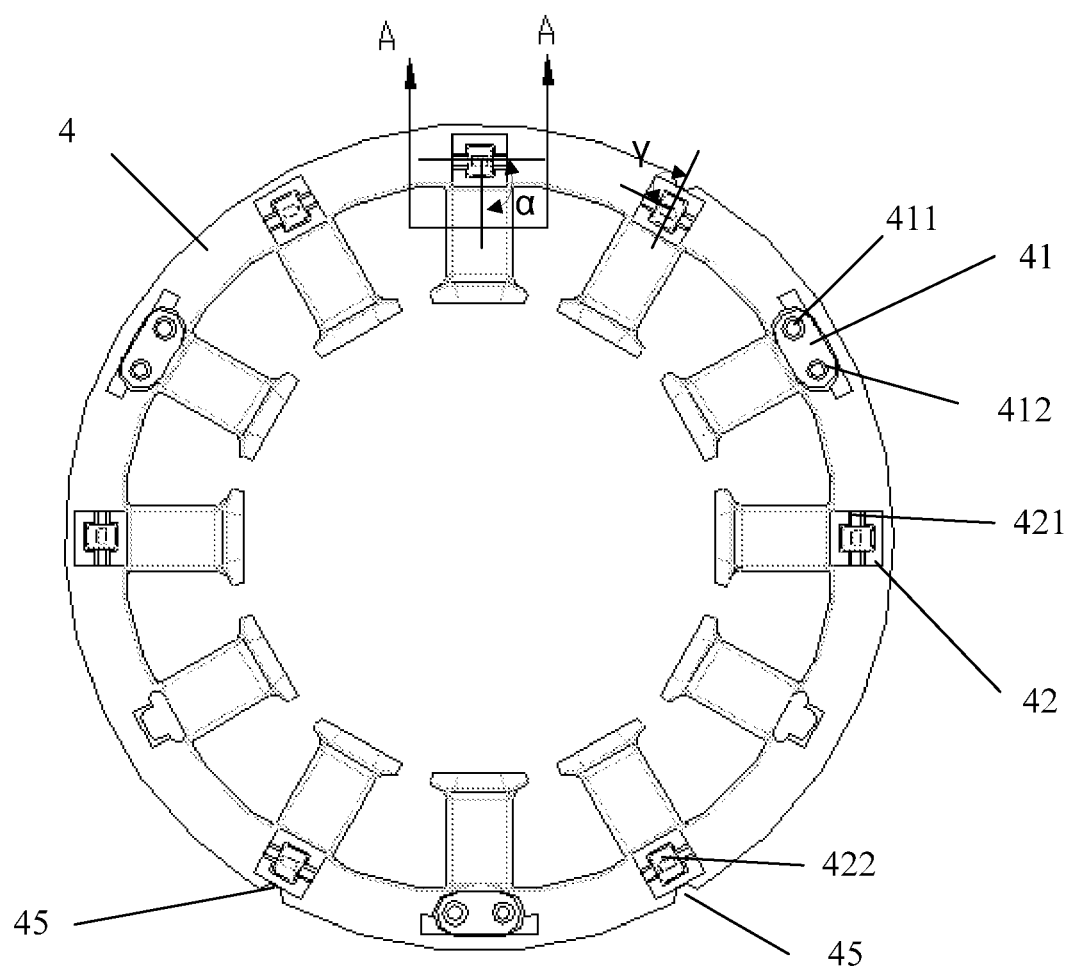
FIG. 2 is a top view of the upper insulating bobbin according to the example embodiment.
Figure 4:
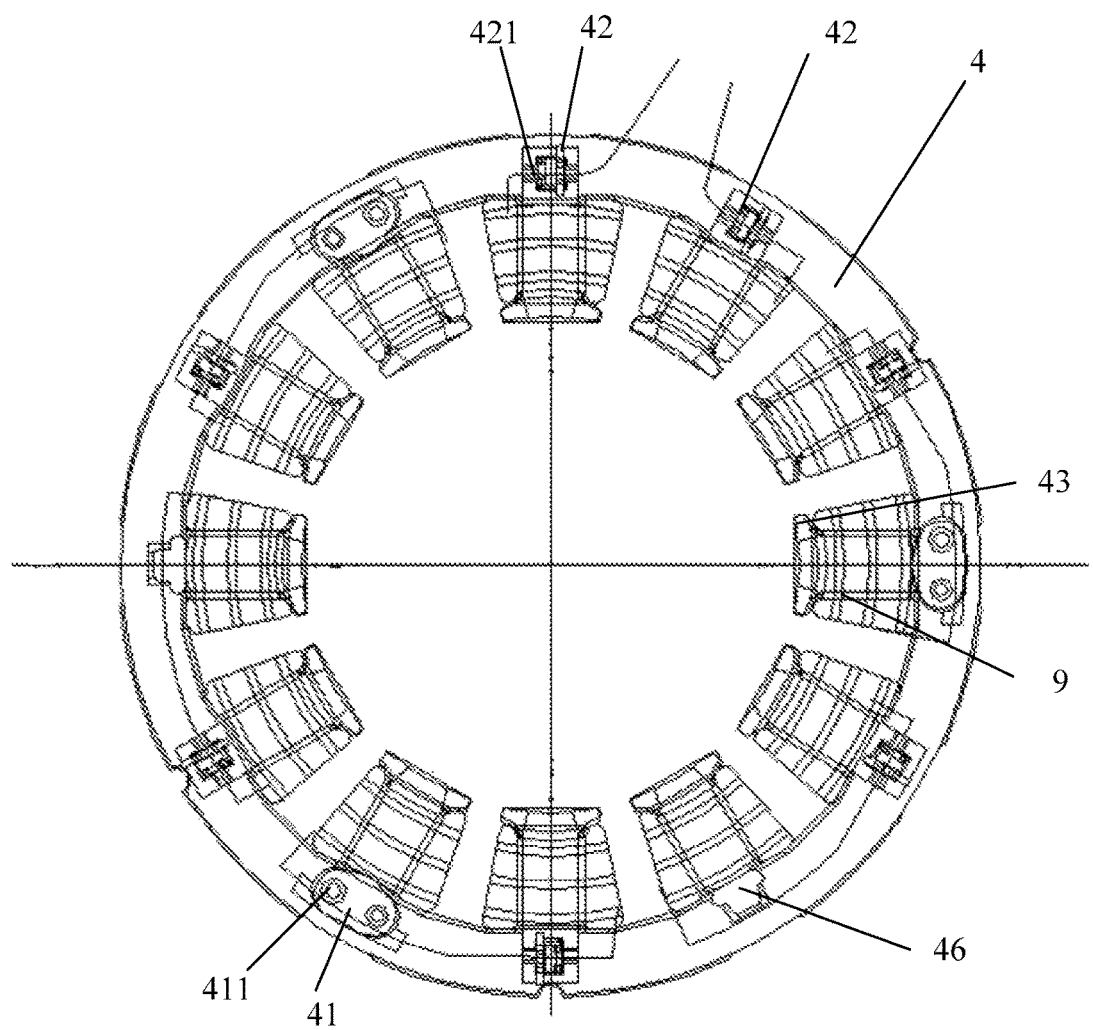
FIG. 4 is a top view showing the stator with the insulating bobbin according to the example embodiment.
Figure 5:
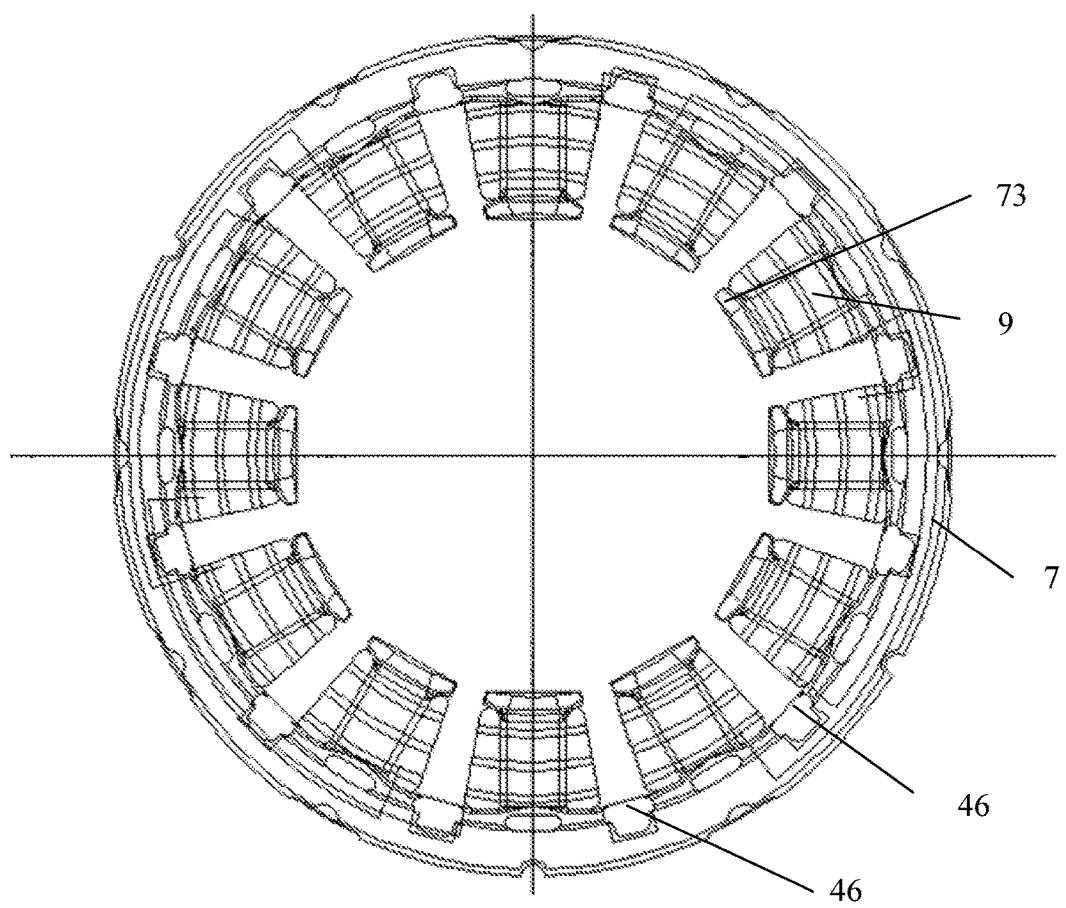
FIG. 5 is a bottom view showing the stator with the insulating bobbin according to the example embodiment.
Figure 6:
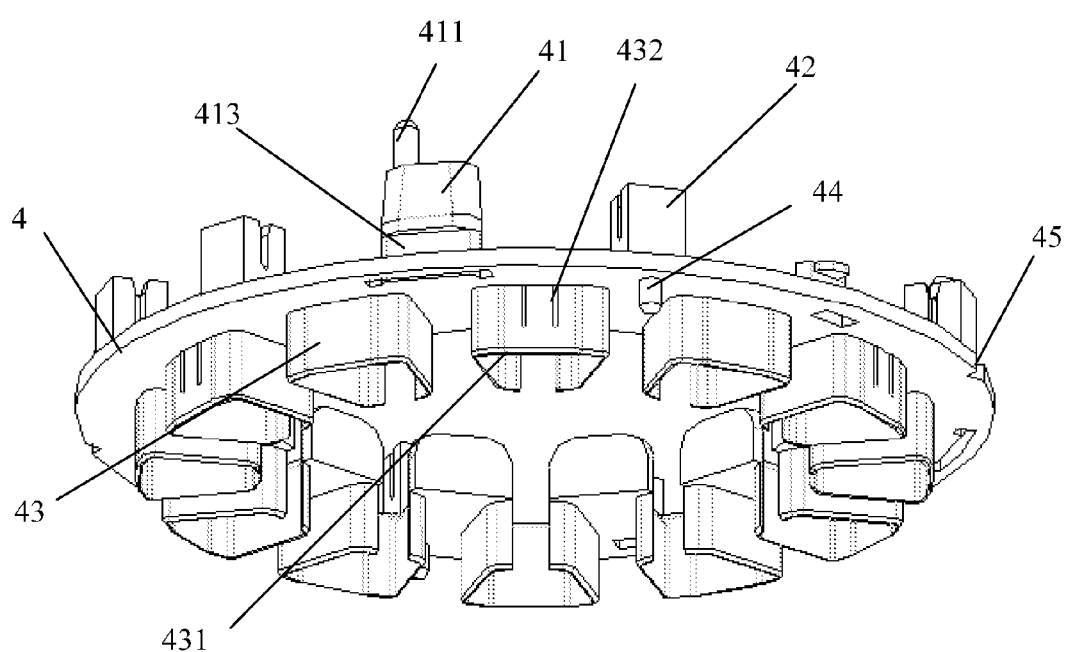
FIG. 6 is a perspective view showing the structure of an upper insulating bobbin according to the example embodiment.

FIG. 1 is a perspective view showing the structure of a stator with an insulating bobbin according to an example embodiment of the present invention. FIG. 2 is a top view of the upper insulating bobbin according to the example embodiment. FIGS. 4 and 5 are respectively top and bottom views showing the stator with the insulating bobbin according to the example embodiment. FIG. 6 is a perspective view showing the structure of an upper insulating bobbin according to the example embodiment.

As shown in FIG. 1, the stator with the insulating bobbin comprises a stator core 5, which has an upper insulating bobbin 4 and a lower insulating bobbin 7 installed on its upper and lower end faces. A plurality of terminal fixing blocks 42 and a plurality of wire-through blocks 46 are provided on an upper surface of the upper insulating bobbin 4. A plurality of wire-through blocks 46 are provided on a lower surface of the lower insulating bobbin 7.

As shown in FIGS. 4 and 5, a coil wound portion 9 includes the upper slot insulation 43 on the upper insulating bobbin 4, the tooth portion (not marked in attached figures) on the stator core 5 and the lower slot insulation on the lower insulating bobbin 7.

According to FIG. 2, the wire-through notch 421 on the terminal fixing block 42 is located along the circumference direction of the upper insulating bobbin 4. An angle α between the wire-through notch 421 and the radial direction of the circumference where its center is located may be 50°-130°. The terminal socket 422 on the terminal fixing block 42 is located along the radial direction of the upper insulating bobbin 4. The angle γ between the terminal socket 422 and the tangent direction of the circumference where it is located may be 50°-130°.

Figure 3:
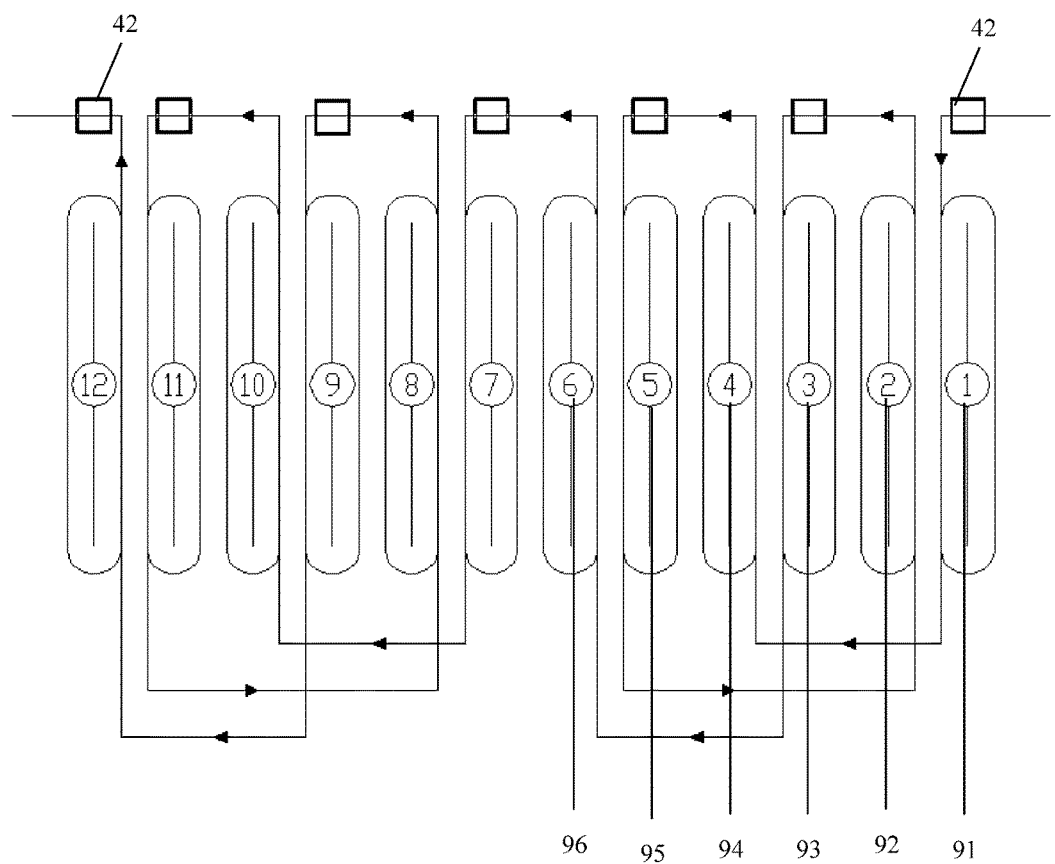
FIG. 3 is a diagram showing a wire winding structure of the stator winding according to the example embodiment.

FIG. 3 shows an example a wire winding structure of the stator winding. According to FIG. 3, there is at least one group of the coil wound portion 9 on the stator core 5. Each group of coil wound portion 9 includes the first coil wound portion 91, the second coil wound portion 92, the third coil wound portion 93, the fourth coil wound portion 94, the fifth coil wound portion 95, and the sixth coil wound portion 96. A single piece of lead wire may be routed into the upper part of the first coil wound portion 91 and finishes winding the first coil wound portion 91. Then, the lead wire may be is routed out of the lower part of the first coil wound portion 91 and into the lower part of the fourth coil wound portion 94. After finishing winding the fourth coil wound portion 94, the lead wire may be routed out of the upper part of the fourth coil wound portion 94 and into the upper part of the fifth coil wound portion 95. After finishing winding the fifth coil wound portion 95, the lead wire may be routed out of the lower part of the fifth coil wound portion 95 and into the lower part of the second coil wound portion 92. After finishing winding the second coil wound portion 92, the lead wire may be routed out of the upper part of the second coil wound portion 92 and into the upper part of the third coil wound portion 93. After finishing winding the third coil wound portion 93, the lead wire may be routed out of the lower part of the third coil wound portion 93 and into the lower part of the sixth coil wound portion 96. After finishing winding the sixth coil wound portion 96, the lead wire may be routed out of the upper part of the sixth coil wound portion 96. Here, the coil wound portions 9 of two adjacent groups are connected by their upper parts.

According to the example embodiment, the coil wound portions 9 of adjacent groups are connected by their upper parts, which means the lead wire routed out of the upper part of the sixth coil wound portion of a group coil wound portion 9 is routed into the upper part of the first coil wound portion 91 of adjacent group of coil wound portion 9. For example, in FIG. 3, the coil wound portion 9 which is marked 1-6 is one group of coil wound portions 9. (The first coil wound portion 91 is marked 1. The second coil wound portion 92 is marked 2 and so on.) According to the example embodiment, after the group of coil wound portion 9 which is marked 1-6 finishes winding as per the method mentioned above, the lead wire is routed out of the upper part of the sixth coil wound portion 96 which is marked 6 and routed into the upper part of the first coil wound portion 91 which is marked 7.

According to the example embodiment, coil wound portion 9 of the stator may be wound as per the method described above. As such, all coils of the stator winding can be wound by a single piece of lead wire so that wire winding operations can be reduced. Moreover, adjacent coil wound portions 9 can share one terminal fixing block 42 so that fewer terminals are needed. Further, the lead wire is routed in or routed out through upper and lower parts of the coil wound portion 9. That is, the lead wire is routed through both faces so that the space at both ends of the stator can be best utilized and the internal space of the brushless motor may be properly used, thereby permitting easy and convenient arrangement of other components.

The terminal fixing block 42 on the upper insulating bobbin 4 may be located along the radial direction of the upper insulating bobbin 4 and the terminal socket 422 on the terminal fixing block 42 may be located along the circumference direction of the upper insulating bobbin 4 during the forming process of related art winding design so the puncture notch of the insulation displacement connection terminal is located along the radial direction of the upper insulating bobbin. In this manner, the lead wire is routed out along the radial direction of the insulating bobbin 4 when the stator winding is wound by the lead wire so that the radial dimension of the stator is increased. However, according to this example embodiment, the wire-through notch 421 of the terminal fixing block 42 on the upper insulating bobbin 4 is located along the circumference direction of the upper insulating bobbin 4 and the terminal socket 422 on the terminal fixing block 42 is located along the radial direction of the upper insulating bobbin 4. In this manner, the puncture notch 82 of the insulation displacement connection terminal 8 is located along the circumference direction of the upper insulating bobbin 4 so that the lead wire can be located along the circumference direction of the upper surface of the upper insulating bobbin 4 when the stator winding is wound by the lead wire to reduce the radial dimension of the stator.

Optionally, according to FIGS. 6 and 2, the upper insulating bobbin 4 may include a plurality of locating bosses 41 evenly distributed along the circumference direction of the upper surface of the upper insulating bobbin 4. The top surface of the locating boss 41 is higher than the top surface of the terminal fixing block 42 with respect to the upper surface of the upper insulating bobbin 4 by an amount greater than zero. The terminal socket 422 of the terminal fixing block 42 may have an insulation displacement connection (IDC) terminal installed.

After the upper insulating bobbin 4, the lower insulating bobbin, and the stator core are assembled together, the coil wound portion that is formed by the upper slot insulation 43 on the upper insulating bobbin 4, the tooth portion of the stator core and the lower slot insulation of the lower insulating bobbin are wound to form the stator winding and the complete stator eventually. The electrical connection between the circuit on the printed circuit board (PCB; shown in FIG. 9) and the lead wire of the stator winding is realized by a terminal that is the insulation displacement connection terminal. One end of the terminal has a contact pin that goes into the terminal connecting hole on the PCB. Another end of the terminal goes into the terminal fixing block 42 on the upper insulation bobbin 4 and punctures the insulation layer of the lead wire that passes through the terminal fixing block 42 to realize the electrical continuity between the lead wire and the PCB.

According to the example embodiment, the structure can prevent the circuit on the PCB from being damaging if the terminal goes into the PCB too deep and also prevent electrical circuit discontinuity if the terminal does not completely go into the PCB by optimizing the height difference between the top surface of the locating boss 41 and the top surface of the terminal fixing block 42.

Figure 7:
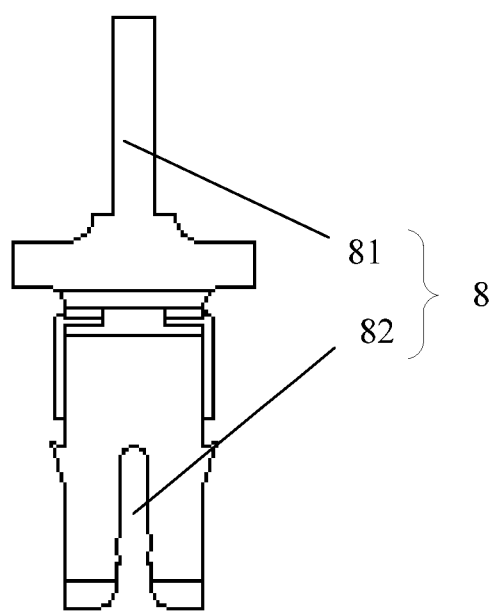
FIG. 7 is a diagram showing the structure of a MAG Mate Multispring terminal according to the example embodiment.

For example, FIG. 7 shows an example terminal socket 422 using the structure of a MAG Mate Multispring terminal. In this configuration, the height difference between the top surface of the locating boss 41 and the top surface of the terminal fixing block 42, as mentioned above, may be 1-5 millimeters.

According to this configuration, one end of MAG Mate Multispring terminal 8 has a contact pin 81 with multiple springs. The contact pin 81 is inserted into the terminal connecting hole on the PCB 2 of FIG. 9. The other end of MAG Mate Multispring terminal 8 has puncture notch 82 which is in the same direction as the wire-through notch 421. When the other end of MAG Mate Multispring terminal 8 is inserted into the wire-through notch 421 of the terminal fixing block 42, the puncture notch 82 closes and the MAG Mate Multispring terminal 8 punctures the insulation layer of the lead wire passing through the puncture notch 82 directly to realize electrical continuity between the lead wire and the PCB 2 of FIG. 9. The MAG Mate Multispring terminal 8 can realize the electrical connection between the lead wire and the PCB without pre-stripping wire or soldering, thereby simplifying the manufacturing process and facilitating automatic production. As mentioned above, the height difference between the top surface of the locating boss 41 and the top surface of the terminal fixing block 42 can be 1-5 millimeters to work with MAG Mate Multispring terminal 8 to prevent damage of the circuit on the PCB if the terminal goes too deep into the PCB and also prevents circuit discontinuity if the terminal does not go completely into the PCB.

Figure 9:
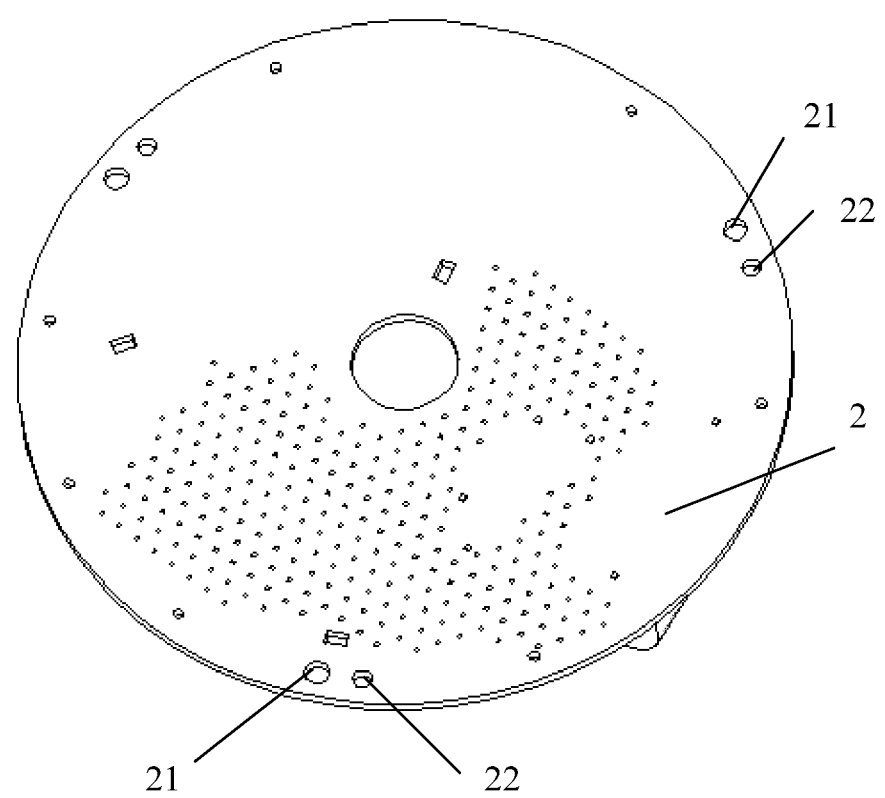
FIG. 9 is a bottom view showing a printed circuit board (PCB) according to the example embodiment.

FIG. 9 shows a bottom view of an example printed circuit board (PCB). Optionally, as shown in FIG. 6 and FIG. 9 show that the top surface of each locating boss 41 has a locating column 411 that cooperates with the locating hole 21 on the PCB 2. The end of the locating column 411 that works with the locating hole is tapered.

According to the example embodiment, when the PCB 2 is assembled with the upper insulating bobbin 4, the locating column 411 on the locating boss 41 will work with the locating hole 21 on the PCB 2 first so that a positional error of the terminal connecting hole on the PCB 2 with respect to the terminal 8 on the upper insulating bobbin 4 is reduced. The end of the locating column 411 that is inserted into the locating hole 21 can be tapered so the locating column 411 can adjust more easily when it is inserted into the locating hole 21 even if there is a deviation in position. Furthermore, the taper can expedite the automatic assembly of the PCB and the upper insulating bobbin 4, increase production efficiency and reduce the quantity of the rejects found in automatic production process.

Optionally, in accordance with FIGS. 2 and 9, the top surface of each locating boss 41 may have a fixing hole 412 that cooperates with a corresponding mounting hole 22 on the PCB 2 and fixed via a screw (not shown). According to this arrangement, after the PCB is assembled with the upper insulating bobbin 4, it can prevent looseness or disconnection between the PCB 2 and the upper insulating bobbin 4 and improve the stability of the brushless motor running during working by fixing the fixing hole 412 and the mounting hole.

Optionally, as shown in FIG. 6 each locating boss 41 may have a wire-through slot 413 for positioning a lead wire on its side wall facing the outside edge of the upper insulating bobbin 4. According to this arrangement, when the upper insulating bobbin 4 is wound, multiple wire-through blocks for positioning the lead wire may be provided on the upper surface of the upper insulating bobbin 4. Each locating boss 41 has wire-through slot 413 for positioning lead wire on its side wall facing the outside edge of the upper insulating bobbin 4 so that the locating boss 41 can position the lead wire. Furthermore, the locating boss 41 can be used to replace some of the wire-through blocks 42. In this way, the number of the wire-through blocks 42 on the upper insulating bobbin 4 can be reduced, thereby simplifying the structure of the upper insulating bobbin 4 and reducing production cost.

Figure 8:
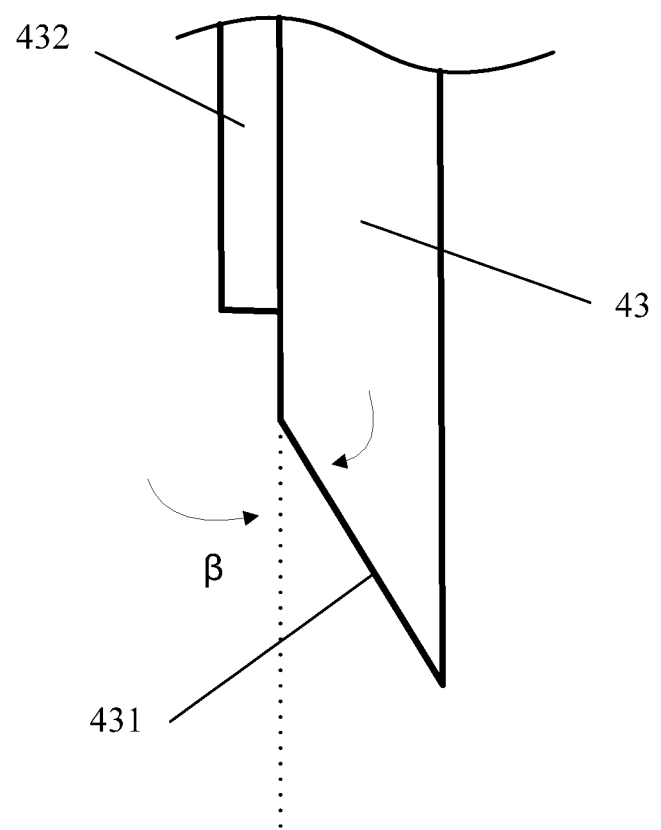
FIG. 8 is a diagram showing local structure of an upper slot insulation of the upper insulating bobbin according to the example embodiment.

Optionally, as shown in FIG. 6 the lower end of the upper slot insulation 43 on the upper insulating bobbin 4 may be sloped to define an error proofing slope 431 on the lower end of the upper slot insulation 43. FIG. 8 further shows the structure of the upper slot insulation 43. The error proofing slope 431 may be sloped back towards the centre of the upper insulating bobbin 4.

FIG. 8 shows that the slope angle 13 between the error proofing slope 431 and the plane where the outer side of the upper slot insulation 43 is located is 10°-60°.

In accordance with this arrangement, the lower part of the upper slot insulation 43 will be inserted into the stator core when the upper insulating bobbin 4 is assembled with the stator core. However, since dimension error and assembly error may exist during the manufacturing process, positional deviation may occur when the upper slot insulation 43 is inserted into the stator core so not all can be inserted successfully. However, when the end of the upper slot insulation 43 having the error proof slope 431 is inserted into the stator core, the upper slot insulation 43 can automatically adjust its position to be inserted into the stator core with an improved success rate and improved efficiency in automatic assembly. Here, the working efficiency and the success rate of insertion can be improved by optimizing the angle β between the error proof slope 431 and the outer side of the upper slot insulation 43.

In yet another optional aspect, as shown in FIG. 6, the outer side of the lower part of the upper slot insulation 43 on the upper insulating bobbin 4 may have at least one anti-slip rib 432. The anti-slip rib 432 may be located vertically along the outer side of the upper slot insulation 43. The anti-slip rib 432 can prevent looseness or disconnection between the upper slot insulation 43 and the stator core after they are assembled, thereby improving stability of the winding structure. The configuration of the anti-slip rib 432 can be varied to optimize performance, thereby achieving stronger reliability of the assembly of the upper slot insulation 43 and the stator core.

In yet another optional aspect, as shown in FIG. 6, at least one anti-slip column 44 may be provide along the circumference direction of the lower surface of the upper insulating bobbin 4. The anti-slip column 44 may project perpendicularly from the lower surface of the upper insulating bobbin 4. Here, an interference fit between the anti-slip column 44 and the stator core can further prevent looseness and disconnection between the upper insulating bobbin 4 and the stator core after they are assembled.

In yet another optional aspect, as shown in FIG. 6, a plurality of recesses 45 may be provided on the side wall of the upper insulating bobbin 4. Here, the plurality of recesses 45 on the side wall of the upper insulating bobbin 4 as a further safeguard to prevent the upper insulating bobbin 4 from being assembled reversely with the stator core. The plurality of recess 45 may be distributed unevenly on the side wall of the upper insulating bobbin 4. For example, three recesses 45 can be used with two being located symmetrically on the side wall of the upper insulating bobbin 4 and the third being closer to one of the previous two recesses. By this asymmetry, the recesses 45 can safeguard against the upper insulating bobbin 4 being installed reversely.

In accordance with the example embodiments described herein, by locating the wire-through notch of the terminal fixing block on the upper insulating bobbin along the circumference direction of the upper insulating bobbin and locating the terminal socket of the terminal fixing block along the radial direction of the upper insulating bobbin, the puncture notch of the insulation displacement connection terminal is located along the circumference direction of the insulating bobbin. Further, the lead wire can be located along the circumference direction of the upper surface of the upper insulating bobbin when the stator winding is wound by the lead wire so the radial direction of the stator can be greatly reduced. Meanwhile, each group of coil wound portion on the stator core is wound as per following structure. A single piece of lead wire may be routed into the upper part of the first coil wound portion and finishes winding the first coil wound portion. Then, the lead wire may be routed out of the lower part of the first coil wound portion and into the lower part of the fourth coil wound portion. After finishing winding the fourth coil wound portion, the lead wire may be routed out of the upper part of the fourth coil wound portion and into the upper part of the fifth coil wound portion. After finishing winding the fifth coil wound portion, the lead wire may be routed out of the lower part of the fifth coil wound portion and into the lower part of the second coil wound portion. After finishing winding the second coil wound portion, the lead wire may be routed out of the upper part of the second coil wound portion and into the upper part of the third coil wound portion. After finishing winding the third coil wound portion, the lead wire may be routed out of the lower part of the third coil wound portion and into the lower part of the sixth coil wound portion. After finishing winding the sixth coil wound portion, the lead wire may be routed out of the lower part of the sixth coil wound portion. As described, two adjacent groups of coil wound portion may be connected by upper parts. In this way, all coils of the winding can be wound by a piece of lead wire so that wire winding operations can be reduced. Moreover, two adjacent coil wound portions can share one insulation displacement connection terminal so that a number of IDC terminals can be reduced and cost can be lowered. Further, the lead wire may be routed from upper and lower parts of the coil wound portion so that space at two end faces of the stator may be utilized better and the internal space of the brushless motor may be easily used for arrangements of other components.

It will be apparent to those skilled in the art that various modifications and variations can be made in the brushless motor of the present invention without departing from the spirit or scope of the invention. Thus, it is intended that the present invention cover the modifications and variations of this invention provided they come within the scope of the appended claims and their equivalents.

What is claimed is:

1. A brushless motor, comprising:
a stator core having a plurality of tooth portions;
a lower insulating bobbin connected to a lower face of the stator core, the lower insulating bobbin having a plurality of lower slot insulation portions each corresponding to a respective tooth portion; and
an upper insulating bobbin connected to an upper face of the stator core, the upper insulating bobbin having a plurality of upper slot insulation portions each corresponding to a respective tooth portions such that the upper slot insulation portions, the tooth portions, and the lower slot insulation portions define a plurality of coil wound portions,
wherein the plurality of coil wound portions includes at least one group of coil wound portions, each group of coil wound portions having a first coil wound portion, a second coil wound portion, a third coil wound portion, a fourth coil wound portion, a fifth coil wound portion, and a sixth coil wound portion,
wherein a single piece of lead wire is routed into an upper part of the first coil wound portion to be wound around the first coil wound portion,
wherein the lead wire is routed out of the lower part of the first coil wound portion and into a lower part of the fourth coil wound portion to be wound around the fourth coil wound portion,
wherein the lead wire is routed out of an upper part of the fourth coil wound portion and into an upper part of the fifth coil wound portion to be wound around the fifth coil wound portion,
wherein the lead wire is routed out of the lower part of the fifth coil wound portion and into a lower part of the second coil wound portion to be wound around the second coil wound portion,
wherein the lead wire is routed out of an upper part of the second coil wound portion and into an upper part of the third coil wound portion to be wound around the third coil wound portion, and
wherein the lead wire is routed out of the lower part of the third coil wound portion and into a lower part of the sixth coil wound portion to be wound around the sixth coil wound portion and routed out from an upper part of the sixth coil.

2. The brushless motor according to claim 1, wherein the at least one group of coil wound portions includes more than one group of coil wound portions, the coil wound portion of adjacent groups are connected by the lead wire at upper parts of two adjacent coil wound portions from the adjacent groups.

3. The brushless motor according to claim 1, wherein the upper insulating bobbin includes a plurality of terminal fixing blocks and a plurality of wire-through blocks on the upper surface thereof.

4. The brushless motor according to claim 3, wherein a first angle between a wire slot of each terminal fixing block and a radial direction of the upper insulating block is 50°-130°, and wherein a second angle between a terminal socket of each terminal fixing block and a circumference direction of the upper bobbin is 50°-130°.

5. The brushless motor according to claim 3, wherein the upper insulating bobbin including a plurality of locating bosses evenly distributed along a circumference direction of an upper surface of the upper insulating bobbin, top surfaces of the locating bosses being higher than top surfaces of the terminal fixing blocks with respect to an upper surface of the upper insulating bobbin.

6. The brushless motor according to claim 5, wherein the terminal socket of the terminal fixing block has an insulation displacement connection terminal mounted inside.

7. The brushless motor according to claim 5, wherein each terminal fixing block is a MAG Mate Multispring terminal installation, and wherein a height difference between the top surfaces of the locating bosses is higher than the top surfaces of the terminal fixing blocks with respect to the upper surface of the upper insulating bobbin by 1-5 millimeters.

8. The brushless motor according to claim 5, further comprising a printed circuit board connected to the upper insulating bobbin,
wherein each locating boss has a locating column projecting from a top surface thereof and the printed circuit hole has a plurality of locating holes such that each locating column is inserted into a respective locating hole.

9. The brushless motor according to claim 8, wherein each locating column has a tapered end.

10. The brushless motor according to claim 8, wherein each locating boss has a fixing hole in the top surface thereof and the printed circuit hole has a plurality of mounting holes such that each fixing hole is positionally corresponded to a respective one of the mounting holes.

11. The brushless motor according to claim 5, each locating boss defines a wire-through slot on its side wall facing the outer edge of the upper insulating bobbin configured to position the lead wire.

12. The brushless motor according to claim 1, the upper slot insulation portions of the upper insulating bobbin are configured to receive a corresponding portion of a stator core, a lower end surface of each upper slot insulation portion being sloped to correct positional errors when mounted with the stator core.

13. The brushless motor according to claim 12, wherein the lower end surface of each upper slot insulation portion is sloped toward a center of the upper insulating bobbin.

14. The brushless motor according to claim 13, wherein an angle of the slope is 10°-60°.

15. The brushless motor according to claim 1, each upper slot insulation portion of the upper insulating bobbin includes an anti-slip rib on an outer side of the upper slot insulation portion.

16. The brushless motor according to claim 15, wherein the anti-slip rib is located vertically along the outer side of the upper slot insulation portion.

17. The brushless motor according to claim 1, wherein a bottom surface of the upper insulating bobbin includes at least one anti-slip column projecting substantially perpendicular therefrom.

18. The brushless motor according to claim 1, wherein an edge of the upper insulating bobbin includes a plurality of recesses configured to ensure an orientation of the upper insulating bobbin relative to a stator core when being mounted with the stator core, the recesses being positioned asymmetrically around the edge of the upper insulating bobbin.

* * * * *